(12) United States Patent
Schlipf et al.

(10) Patent No.: US 12,208,895 B2
(45) Date of Patent: Jan. 28, 2025

(54) WING FOR AN AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 33 days.

(21) Appl. No.: 18/129,419

(22) Filed: Mar. 31, 2023

(65) Prior Publication Data

US 2023/0312080 A1 Oct. 5, 2023

(30) Foreign Application Priority Data

Mar. 31, 2022 (EP) .................................... 22166193

(51) Int. Cl.
*B64C 9/04* (2006.01)
*B64C 9/02* (2006.01)
*B64C 13/38* (2006.01)

(52) U.S. Cl.
CPC .................. *B64C 9/04* (2013.01); *B64C 9/02* (2013.01); *B64C 13/38* (2013.01)

(58) Field of Classification Search
CPC .. B64C 9/04; B64C 9/02; B64C 13/38; B64C 9/20
See application file for complete search history.

(56) References Cited

U.S. PATENT DOCUMENTS

| | | |
|---|---|---|
| 2,813,689 A | 11/1957 | Norton et al. |
| 3,985,319 A | 10/1976 | Dean et al. |
| 7,740,205 B1 * | 6/2010 | Nahas .................. B64C 9/20 244/45 R |
| 2006/0169848 A1 * | 8/2006 | Libby .................. B64C 9/06 244/216 |
| 2006/0226296 A1 * | 10/2006 | Perez-Sanchez ......... B64C 9/18 244/215 |
| 2019/0185138 A1 * | 6/2019 | Lauk .................. B64C 9/34 |

(Continued)

FOREIGN PATENT DOCUMENTS

| | | |
|---|---|---|
| DE | 692 059 | 6/1940 |
| DE | 21 25 971 | 12/1972 |
| EP | 0 273 410 | 7/1988 |

(Continued)

OTHER PUBLICATIONS

Extended Search Report for EP22166193.7, dated Sep. 1, 2022, 8 pages.

*Primary Examiner* — Michael C Zarroli
*Assistant Examiner* — Peter A Taraschi
(74) *Attorney, Agent, or Firm* — Nixon & Vanderhye P.C.

(57) ABSTRACT

The disclosure concerns a wing for an aircraft including a main wing and a trailing edge high lift assembly movably arranged at a trailing edge of the main wing, the trailing edge high lift assembly having a flap and a connection assembly movably mounting the flap to the main wing, such that the flap is movable between a retracted position and at least one extended position. The connection assembly includes an actuator unit for moving the flap between the retracted position and the at least one extended position. The flap includes a leading edge part and a trailing edge part mounted to the leading edge part in a manner pivotable about a pivot axis.

16 Claims, 5 Drawing Sheets

(56) References Cited

U.S. PATENT DOCUMENTS

2023/0143989 A1* 5/2023 Henke ................... B64C 1/26
                                                      244/17.19

FOREIGN PATENT DOCUMENTS

EP        2 851 287         3/2015
GB         1368347 A  *  9/1974   ............... B64C 9/16
KR      100 577 757         5/2006

* cited by examiner

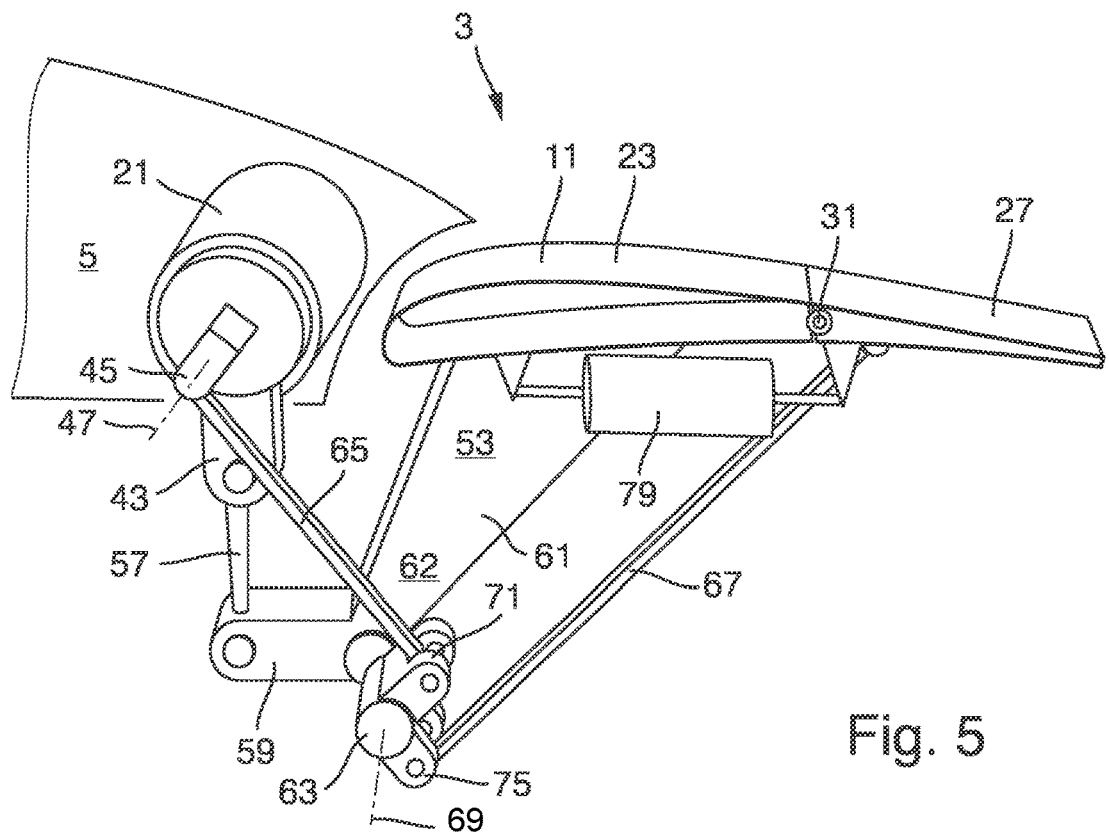

WING FOR AN AIRCRAFT

CROSS REFERENCE TO RELATED APPLICATION

This application claims priority to and incorporates by reference European Application Number EP 22166193.7, filed Mar. 31, 2022.

BACKGROUND

The present invention relates to a wing for an aircraft, and more specifically, relates to
a trailing edge high lift assembly for such a wing, and to
an aircraft comprising such a wing and/or comprising such a trailing edge high lift assembly.

The wing comprises a main wing and a trailing edge high lift assembly. The trailing edge high lift assembly is movably arranged at a trailing edge of the main wing and comprises a flap and a connection assembly. The connection assembly movably mounts the flap to the main wing, such that the flap is movable relative to the main wing between a retracted position with a reduced chord length and/or curvature of the wing, and at least one extended position with an extended chord length and/or curvature of the wing. The connection assembly comprises an actuator unit, e.g. including a rotary motor or a linear motor, for moving the flap between the retracted position and the at least one extended position. The flap comprises a leading edge part, in particular a main flap part, comprising the leading edge of the flap, and a trailing edge part, in particular a tab, comprising the trailing edge of the flap, mounted to the leading edge part, in particular to the trailing edge of the leading edge part, in a manner pivotable about a pivot axis by, for example, extending in a span direction.

Such wings are commonly known in the art. Some known wings comprise a trailing edge high lift assembly having a flap that is movable relative to the main wing in a rotational manner, for example, by the flap being fixedly mounted on a lever that is rotatably mounted to the trailing edge of the main wing and that is driven by a drive strut mounted to a rotating drive arm. Other known wings have a trailing edge high lift assembly with a flap that is movable relative to the main wing in a combined linear and rotational manner, for example, by the flap being rotatably mounted on a carriage running along a linear guide rail while the flap is driven by a drive strut mounted to a rotating drive arm, so that the flap carries out a coupled linear and rotational motion. Such trailing edge high lift assemblies are designed to be deployed during take-off and landing of an aircraft to increase lift and reduce minimum air speed by increasing wing area, curvature, and angle of attack, and to be retracted during cruise flight when air speed is high to reduce drag.

However, more recent investigations have shown that it might be advantageous to have a morphing wing that might adjust wing area, curvature, and angle of attack during the entire flight, for example, as a "real-time" response to gust or to optimise lift, drag and structural loading during the flight. This can be achieved by the two-part flap comprising leading edge part and trailing edge part which can be moved relative to one another as required. However, for moving the leading edge part and the trailing edge part of the flap independently, usually at least two independent actuators are provided—one actuator for moving the leading edge part relative to the wing, and another actuator for moving the trailing edge part relative to the leading edge part.

SUMMARY

The present disclosure encompasses a wing having a trailing edge high lift assembly with a simplified actuation concept.

The present invention encompasses that the actuator unit be coupled to the leading edge part via a first linkage and be coupled to the trailing edge part via a second linkage. Furthermore, the actuator unit is configured to move both the leading edge part relative to the main wing via the first linkage and the trailing edge part relative to the leading edge part via the second linkage, by for example, actuation movement along a single degree of freedom, for example, rotation about a single rotation axis. In such a way, the number and complexity of the required actuators can be reduced, thereby largely simplifying the trailing edge high lift assembly and reducing its costs.

According to an exemplary embodiment, the connection assembly is configured such that the flap is movable relative to the main wing in a rotational manner. The flap may be mounted to the main wing in a manner rotatable about a flap rotation axis. The flap rotation axis may be located outside the profile of the flap, for example, spaced apart from the flap, for example, by a flap lever arm. Such a rotationally mounted flap relates to a very simple and reliable connection assembly and trailing edge high lift assembly design.

According to an exemplary embodiment, the actuator unit comprises a drive shaft, a first drive arm and a second drive arm. The drive shaft is rotatably driven about a drive axis. The first drive arm and the second drive arm are mounted to the drive shaft in a way rotationally fixed relative to one another. The first drive arm is coupled to the first linkage for driving the first linkage. The second drive arm is coupled to the second linkage for driving the second linkage. In such a way, both the first linkage and the second linkage can be driven merely by rotation of the single drive shaft about the drive axis.

In particular, the actuator unit may comprise a rotary motor, such as an electric, hydraulic or pneumatic rotary motor. The drive shaft is formed as or coupled to a rotating output shaft of the rotary motor. For example, the drive shaft might be coupled to the rotating output shaft of the rotary motor via a gear unit. In such a way, a very simple, compact and efficient actuator unit is provided.

Alternatively, the actuator unit may comprise a linear motor, such as an electric, hydraulic or pneumatic linear motor. The drive shaft is coupled to a drive lever arm in a rotationally fixed manner. The drive lever arm is pivotably coupled to an output shaft of the linear motor. In such a way, also a linear motor can be utilized for driving the drive shaft.

According to an exemplary embodiment, the first linkage comprises a flap lever arm mounted to the leading edge part of the flap, for example, fixedly mounted to the lower side of the leading edge part of the flap, and mounted to the main wing in a manner rotatable about a flap rotation axis. By such a flap lever arm a rotatable mounting of the flap to the main wing is enabled.

In particular, the first linkage may comprise a first drive strut rotatably mounted to the first drive arm, for example, by its one end, and rotatably mounted to the flap lever arm, for example, by its opposite end. Such a first drive strut allows an efficient actuation of the flap lever arm.

The flap lever arm may be formed as a first rocker element having a first portion extending between the first drive strut and the flap rotation axis, and having a second portion extending between the flap rotation axis and the leading edge part of the flap. By such a first rocker element a very efficient actuation of the flap is enabled.

According to an exemplary embodiment, the second linkage comprises a second rocker element, a second drive strut, and a third drive strut. The second rocker element is mounted to the main wing in a way rotatable about a rocker axis, for example, parallel to the flap rotation axis, and has a first portion extending from the rocker axis in a first direction and a second portion extending from the rocker axis in a second direction different from the first direction. The second drive strut is rotatably mounted to the second drive arm, for example, by its one end, and is rotatably mounted to the first portion of the second rocker element, for example, by its opposite end. The third drive strut is rotatably mounted to the second portion of the second rocker element, for example, by its one end, and is rotatably mounted to the trailing edge part of the flap, for example, to lower side of the trailing edge part of the flap, for example, by its opposite end. By such a second linkage employing a second rocker element a very efficient actuation of the trailing edge part of the flap is enabled.

In particular, the rocker axis may be coaxial with the flap rotation axis. In such a way, a very efficient actuation of the first and second linkages is enabled. However, the rocker axis might also be parallelly spaced from the flap rotation axis. Also, the rocker axis and/or the flap rotation axis might be parallel to the drive axis and/or to the pivot axis.

According to an exemplary embodiment, the first linkage and the second linkage are configured in the following manner. When the drive shaft rotates within a first angular range the trailing edge part of the flap rotates about the pivot axis relative to the leading edge part of the flap without the leading edge part essentially rotating about the flap rotation axis. The first angular range may relate to a dead point range of the first linkage. When the drive shaft rotates within a second angular range, may be succeeding the first angular range, the leading edge part of the flap rotates about the flap rotation axis without the trailing edge part essentially rotating about the pivot axis relative to the leading edge part of the flap. The second angular range may relate to a dead point range of the second linkage. In such a way, the leading edge part and the trailing edge part of the wing can be actuated by a single actuator unit widely independent from one another.

According to an exemplary embodiment, a damper is provided between the leading edge part and the trailing edge part of the flap. The damper is configured to damp pivoting movement of the trailing edge part relative to the leading edge part, for example, pivoting vibration, in case of a failure of the second linkage. By using the damper, it is possible that the trailing edge part is actuated and/or adjusted by a single second linkage, since in case of failure of the single second linkage vibration of the trailing edge part can be damped.

According to an exemplary embodiment, the connection assembly is a first connection assembly and the trailing edge high lift assembly comprises a second connection assembly, for example, formed as the first connection assembly, movably mounting the flap to the main wing together with the first connection assembly. The trailing edge part of the flap comprises a first part portion and a second part portion arranged next to each other in a span direction, i.e., along the trailing edge of the leading edge part. The second linkage of the first connection assembly is coupled to the first part portion and the second linkage of the second connection assembly is coupled to the second part portion of the trailing edge part of the flap, while for example, the first linkage of the first connection assembly and the first linkage of the second connection assembly are coupled to the common leading edge part of the flap. In such a way, the flap might include two or more separate part portions of the trailing edge part that can be actuated individually by respective two or more connection assemblies. Also, three or more part portions and respective connection assemblies are possible.

An exemplary embodiment also relates to a trailing edge high lift assembly for the wing and/or as used in the wing according to any of the embodiments explained above. In particular, the trailing edge high lift assembly comprises a flap and a connection assembly for movably mounting the flap to the main wing, such that the flap is movable between a retracted position and at least one extended position. The connection assembly comprises an actuator unit for moving the flap between the retracted position and the at least one extended position. The flap comprises a leading edge part and a trailing edge part mounted to the leading edge part in a manner pivotable about a pivot axis. The actuator unit is coupled to the leading edge part via a first linkage and is coupled to the trailing edge part via a second linkage. The actuator unit is configured to move both the leading edge part via the first linkage and the trailing edge part via the second linkage. The features and effects explained above in connection with the wing apply vis-à-vis also to the trailing edge high lift assembly.

An exemplary embodiment also relates to an aircraft comprising the wing according to any of the embodiments explained above, and/or comprising the trailing edge high lift assembly according to any of the embodiments explained above. The features and effects explained above in connection with the wing and the trailing edge high lift assembly apply vis-à-vis also to the aircraft.

BRIEF DESCRIPTION OF THE DRAWINGS

For an understanding of embodiments of the disclosure, reference is now made to the following description taken in conjunction with the accompanying drawings.

FIG. 5 is a schematic perspective view of a wing according to a second embodiment of the invention with a focus on the trailing edge high lift assembly including a damper.

FIG. 6 is a schematic perspective view of a wing according to a third embodiment of the invention with a focus on the trailing edge high lift assembly including an actuator unit with a linear motor.

DETAILED DESCRIPTION OF SOME EMBODIMENTS

Some embodiments will now be described with reference to the Figures.

Figure 1:
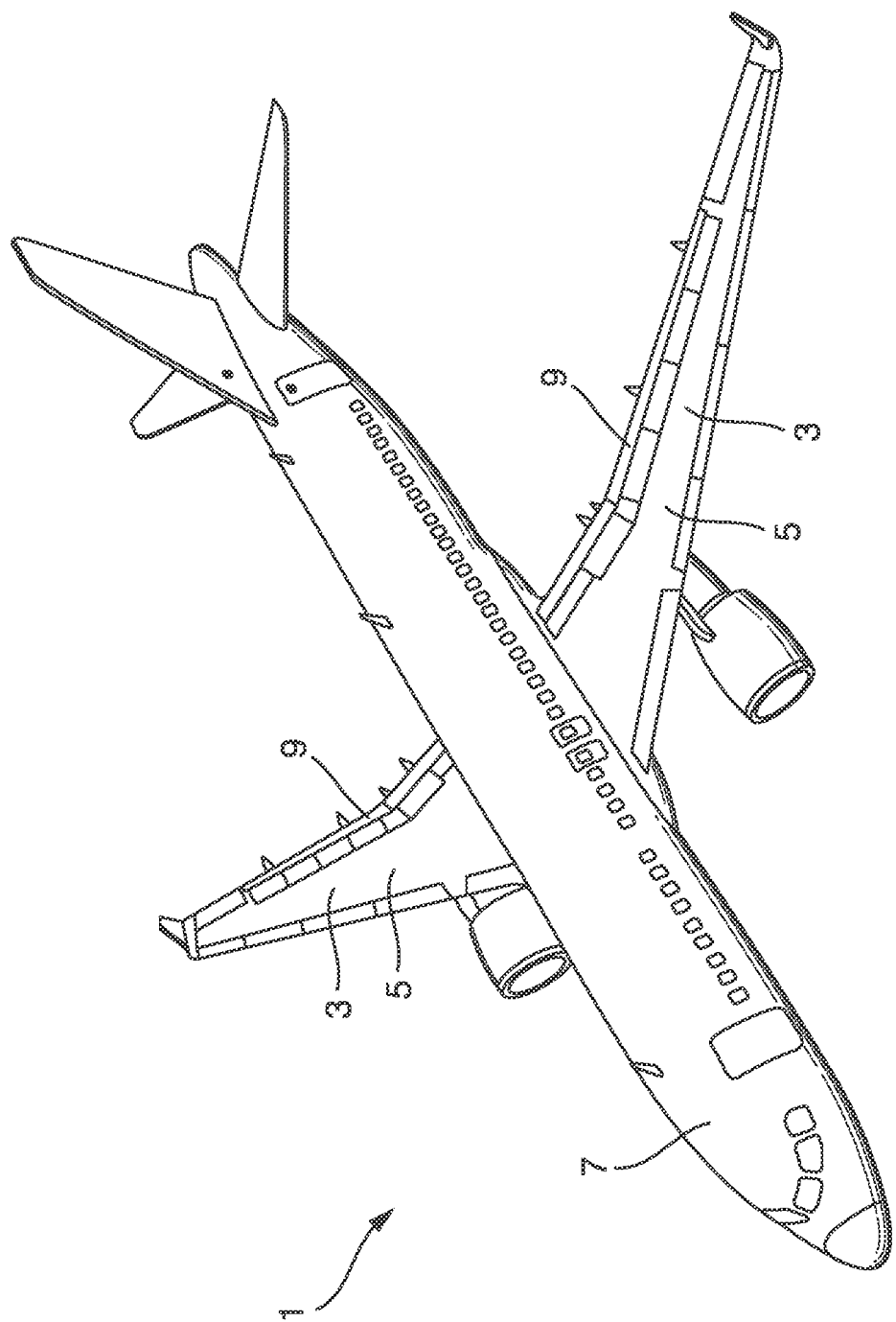
FIG. 1 is a perspective view of an aircraft according to an embodiment of the invention.

FIG. 1 shows an exemplary aircraft 1 according to an embodiment of the present invention. The aircraft 1 comprises a wing 3 including a main wing 5 mounted to a fuselage 7, and a trailing edge high lift assembly 9 movably mounted to the main wing 5.

FIGS. 2 to 7 illustrate four embodiments of the wing 3 of the aircraft 1 shown in FIG. 1. The wing 3 shown in FIGS. 2 to 4 comprises a main wing 5 and a trailing edge high lift assembly 9. The trailing edge high lift assembly 9 is movably arranged at a trailing edge of the main wing 5 and comprises a flap 11 and a connection assembly 13. The connection assembly 13 movably mounts the flap 11 to the main wing 5, such that the flap 11 is movable between a retracted position 15 with a reduced chord length and curvature of the wing 3, and at least one extended position 17 with an extended chord length and curvature of the wing 3. The flap 11 is mounted to the main wing 5 in a manner rotatable about a flap rotation axis 19, wherein the flap rotation axis 19 is located outside the flap profile spaced apart from the flap 11.

The connection assembly 13 comprises an actuator unit 21 for moving the flap 11 between the retracted position 15 and the at least one extended position 17. The flap 11 comprises a leading edge part 23 including the leading edge 25 of the flap 11, and a trailing edge part 27 including the trailing edge 29 of the flap 11 and mounted to the leading edge part 23 in a manner pivotable about a pivot axis 31 extending in a span direction 33. The actuator unit 21 is coupled to the leading edge part 23 via a first linkage 35 and is coupled to the trailing edge part 27 via a second linkage 37. Further, the actuator unit 21 is configured to move both the leading edge part 23 relative to the main wing 5 via the first linkage 35 and the trailing edge part 27 relative to the leading edge part 23 via the second linkage 37, by actuation movement along a single degree of freedom, namely by rotation about a single rotation axis.

Figure 2:
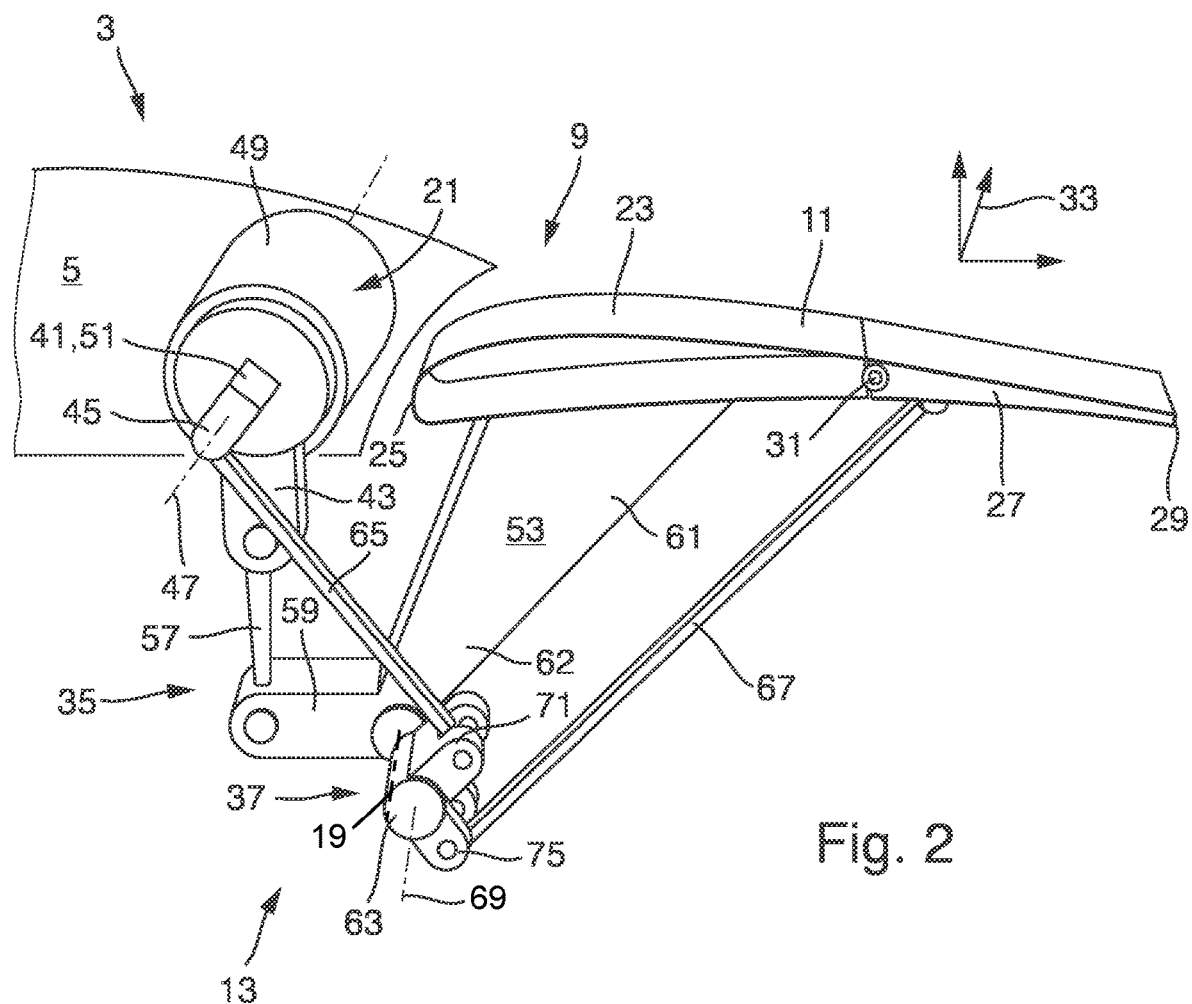
FIG. 2 is a schematic perspective view of a wing according to a first embodiment of the invention with a focus on the trailing edge high lift assembly.

As shown in FIG. 2, the actuator unit 21 comprises a drive shaft 41, a first drive arm 43 and a second drive arm 45. The drive shaft 41 is rotatably driven about a drive axis 47. The first drive arm 43 and the second drive arm 45 are mounted to the drive shaft 41 in a way rotationally fixed relative to one another. The first drive arm 43 is coupled to the first linkage 35 for driving the first linkage 35. The second drive arm 45 is coupled to the second linkage 37 for driving the second linkage 37. In the first embodiment shown in FIG. 2, the actuator unit 21 comprises a rotary motor 49, specifically an electric, hydraulic or pneumatic rotary motor. The drive shaft 41 is formed as or coupled to a rotating output shaft 51 of the rotary motor 49.

As also shown in FIG. 2, the first linkage 35 comprises a flap lever arm 53 fixedly mounted to the lower side of the leading edge part 23 of the flap 11 and mounted to the main wing 5 in a manner rotatable about the flap rotation axis 19. Further, the first linkage 35 comprises a first drive strut 57 rotatably mounted to the first drive arm 43 by its one end and rotatably mounted to the flap lever arm 53 by its opposite end. The flap lever arm 53 is formed as a first rocker element 62 having a first portion 59 extending between the first drive strut 57 and the flap rotation axis 19, and having a second portion 61 extending between the flap rotation axis 19 and the leading edge part 23 of the flap 11. The first portion 59 and the second portion 61 of the first rocker element 62 in the present embodiment are spaced apart by between 100° and 150°.

As shown in FIG. 2, the second linkage 37 comprises a second rocker element 63, a second drive strut 65, and a third drive strut 67. The second rocker element 63 is mounted to the main wing 5 in a way rotatable about a rocker axis 69 and has a first portion 71 extending from the rocker axis 69 in a first direction and a second portion 75 extending from the rocker axis 69 in a second direction different from the first direction, in the present embodiment spaced apart from the first direction by between 90° and 120°. The second drive strut 65 is rotatably mounted to the second drive arm 45 by its one end and is rotatably mounted to the first portion 71 of the second rocker element 63 by its opposite end. The third drive strut 67 is rotatably mounted to the second portion 75 of the second rocker element 63 by its one end and is rotatably mounted to lower side of the trailing edge part 27 of the flap 11 by its opposite end. In the present embodiment, the rocker axis 69 is slightly spaced in parallel from the flap rotation axis 19, but in other embodiments might also be coaxial with the flap rotation axis 19. Also in the present embodiment, the rocker axis 69 and the flap rotation axis 19 are parallel to the drive axis and 47 to the pivot axis 31.

Figure 3:
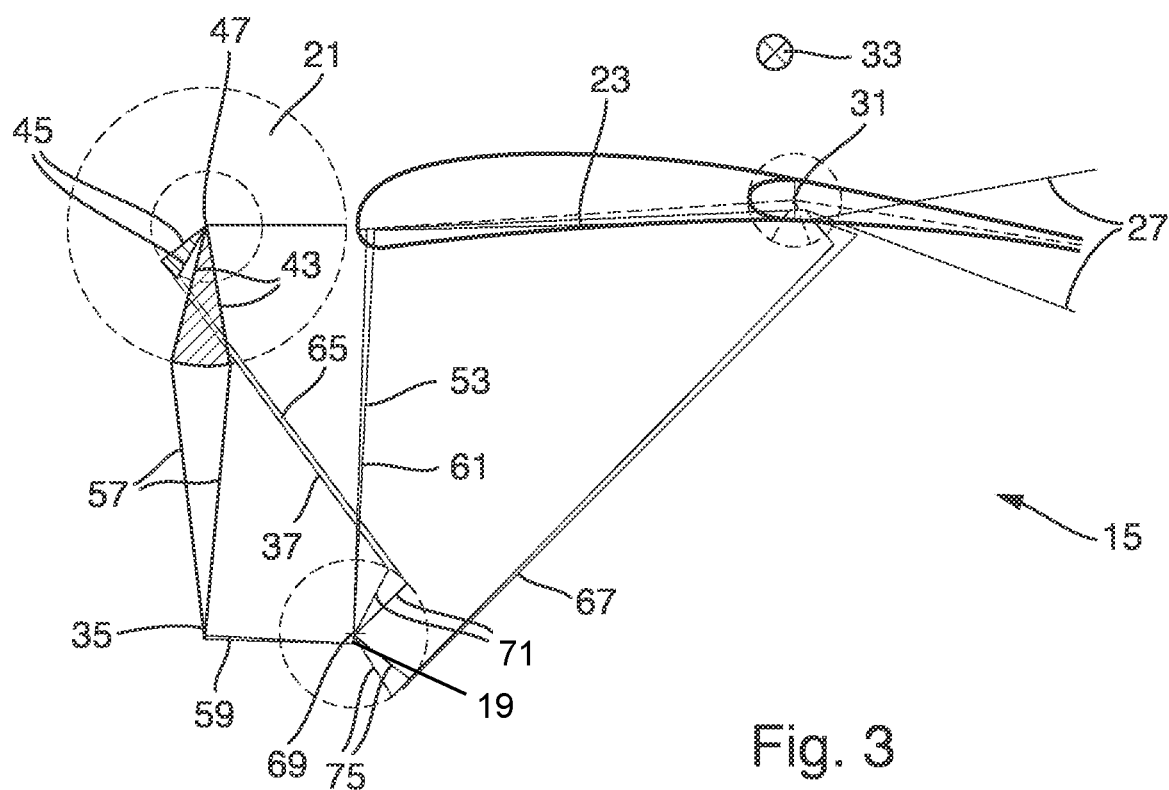
FIG. 3 is a concept sketch illustrating the kinematic principle of the wing shown in FIG. 2, wherein the drive shaft rotates within a first angular range and moves essentially only the trailing edge part of the flap.
Figure 4:
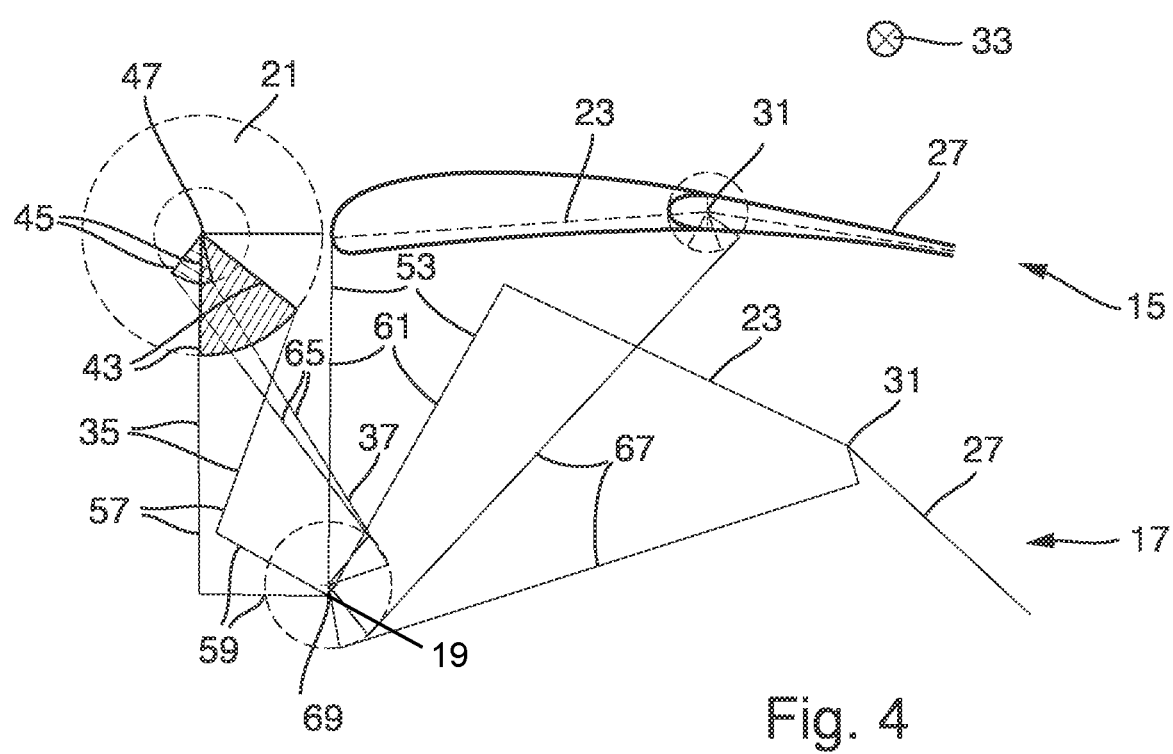
FIG. 4 is a concept sketch illustrating the kinematic principle of the wing shown in FIG. 2, wherein the drive shaft rotates within a second angular range and moves essentially only the leading edge part of the flap.

As indicated in the kinematic sketches of FIGS. 3 and 4, the first linkage 35 and the second linkage 37 are configured in the following manner. When the drive shaft 41 rotates within a first angular range the trailing edge part 27 of the flap 11 rotates about the pivot axis 31 relative to the leading edge part 23 of the flap 11 without the leading edge part 23 essentially rotating about the flap rotation axis 19. I.e., the first angular range relates to a dead point range of the first linkage 35. When the drive shaft 41 rotates within a second angular range succeeding the first angular range, the leading edge part 23 of the flap 11 rotates about the flap rotation axis 19 without the trailing edge part 27 essentially rotating about the pivot axis 31 relative to the leading edge part 23 of the flap 11. I.e., the second angular range relates to a dead point range of the second linkage 37.

The second embodiment shown in FIG. 5 differs from the first embodiment shown in FIG. 2 in that a damper 79 is provided between the leading edge part 23 and the trailing edge part 27 of the flap 11. The damper 79 is configured to damp pivoting movement of the trailing edge part 27 relative to the leading edge part 23, for example, undesired pivoting vibration, such as in case of a failure of the second linkage 37.

The third embodiment shown in FIG. 6 differs from the first embodiment shown in FIG. 2 in that the actuator unit 21 comprises a linear motor 85, such as an electric, hydraulic or pneumatic linear motor. The drive shaft 41 is coupled to a drive lever arm 81 in a rotationally fixed manner. The drive lever arm 81 is pivotably coupled to an output shaft 51 of the linear motor 85.

Figure 7:
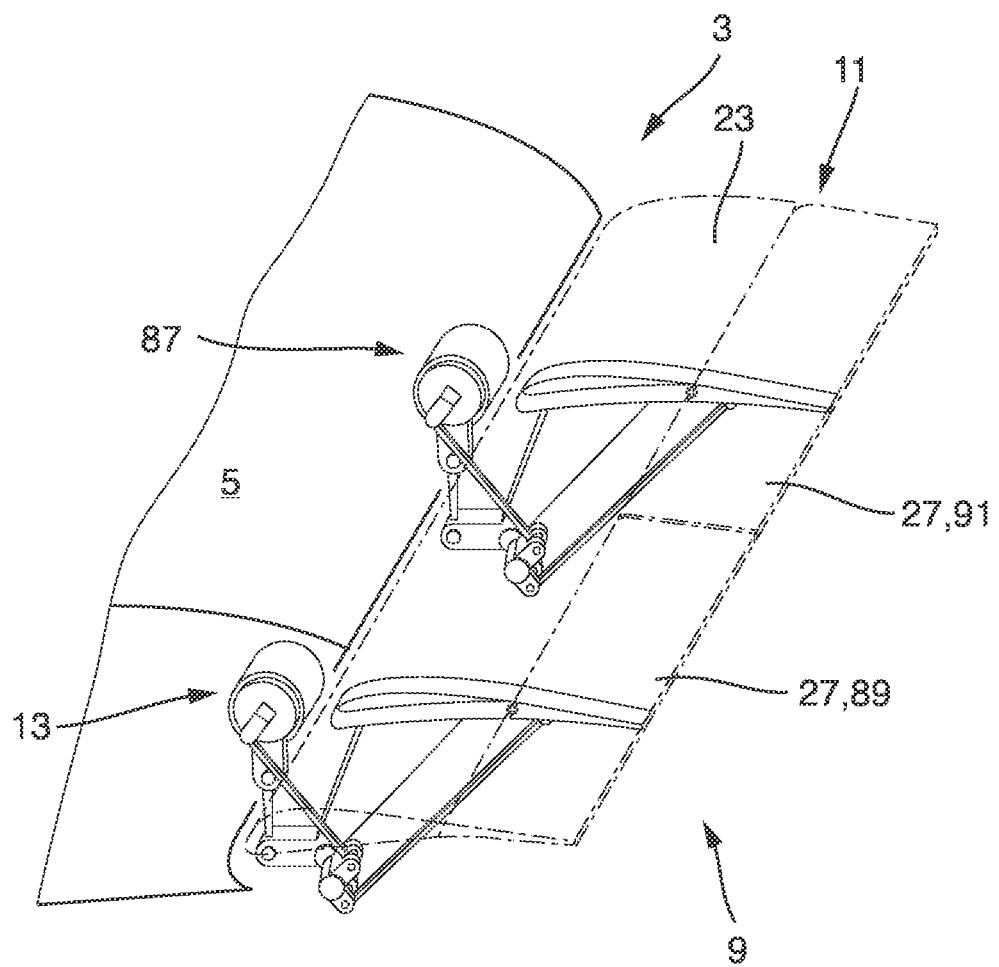
FIG. 7 is a schematic perspective view of a wing according to a fourth embodiment of the invention with a focus on the trailing edge high lift assembly including a flap with a two-portion trailing edge part and two connection assemblies.

The third embodiment shown in FIG. 7 differs from the first embodiment shown in FIG. 2 in that the connection assembly 13 is a first connection assembly and the trailing edge high lift assembly 9 comprises a second connection assembly 87 formed as the first connection assembly and movably mounting the flap 11 to the main wing 5 together with the first connection assembly 13. The trailing edge part 27 of the flap 11 comprises a first part portion 89 and a second part portion 91 arranged next to each other in a span direction 33 along the trailing edge (29) of the leading edge part 23. The second linkage 37 of the first connection assembly 13 is coupled to the first part portion 89 and the second linkage 37 of the second connection assembly 87 is coupled to the second part portion 91 of the trailing edge part 27 of the flap 11, while the first linkage 35 of the first connection assembly 13 and the first linkage 35 of the second connection assembly 87 are coupled to the common leading edge part 23 of the flap 11.

By the trailing edge high lift assembly 9 according to the invention, the number and complexity of the required actuators can be reduced, thereby largely simplifying the trailing edge high lift assembly 9 and reducing its costs.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing, and
a trailing edge high lift assembly movably arranged at a trailing edge of the main wing, the trailing edge high lift assembly comprising:
a flap, and
a connection assembly movably mounting the flap to the main wing, such that the flap is movable between a retracted position and at least one extended position,
wherein the connection assembly comprises an actuator unit for moving the flap between the retracted position and the at least one extended position,
wherein the flap comprises a leading edge part and a trailing edge part mounted to the leading edge part in a manner pivotable about a pivot axis,
wherein the actuator unit is coupled to the leading edge part via a first linkage and is coupled to the trailing edge part via a separate second linkage,
the actuator unit is configured to move both the leading edge part via the first linkage and the trailing edge part via the separate second linkage.

2. The wing according to claim 1, wherein the connection assembly is configured such that the flap is movable relative to the main wing in a rotational manner.

3. The wing according to claim 1, wherein the actuator unit comprises a drive shaft, a first drive arm and a second drive arm,
wherein the drive shaft is rotatably driven about a drive axis,
wherein the first drive arm and the second drive arm are mounted to the drive shaft in a way rotationally fixed to one another,
wherein the first drive arm is coupled to the first linkage for driving the first linkage, and
wherein the second drive arm is coupled to the second linkage for driving the second linkage.

4. The wing according to claim 3, wherein the actuator unit further comprises a rotary motor and the drive shaft is formed as or coupled to a rotating output shaft of the rotary motor.

5. The wing according to claim 3, wherein the actuator unit comprises a linear motor and the drive shaft is coupled to a drive lever arm in a rotationally fixed manner, wherein the drive lever arm is pivotably coupled to an output shaft of the linear motor.

6. The wing according to claim 3, wherein the first linkage comprises a flap lever arm mounted to the leading edge part of the flap and mounted to the main wing in a manner rotatable about a flap rotation axis.

7. The wing according to claim 6, wherein the first linkage comprises a first drive strut rotatably mounted to the first drive arm and rotatably mounted to the flap lever arm.

8. The wing according to claim 7, wherein the flap lever arm is formed as a first rocker element having a first portion extending between the first drive strut and the flap rotation axis, and having a second portion extending between the flap rotation axis and the leading edge part of the flap.

9. The wing according to claim 3, wherein the second linkage comprises a second rocker element, a second drive strut, and a third drive strut,
wherein the second rocker element is mounted to the main wing in a way rotatable about a rocker axis and has a first portion extending from the rocker axis in a first direction, and a second portion extending from the rocker axis in a second direction,
wherein the second drive strut is rotatably mounted to the second drive arm and rotatably mounted to the first portion of the second rocker element, and
wherein the third drive strut is rotatably mounted to the second portion of the second rocker element and rotatably mounted to the trailing edge part of the flap.

10. The wing according to claim 9, wherein the rocker axis is coaxial with the flap rotation axis.

11. The wing according to claim 3, wherein the first linkage and the second linkage are configured such that,
when the drive shaft rotates within a first angular range the trailing edge part of the flap rotates about the pivot axis relative to the leading edge part of the flap without the leading edge part essentially rotating about a flap rotation axis, and
when the drive shaft rotates within a second angular range the leading edge part of the flap rotates about the flap rotation axis without the trailing edge part essentially rotating about the pivot axis relative to the leading edge part of the flap.

12. The wing according to claim 1, wherein a damper is provided between the leading edge part and the trailing edge part of the flap, wherein the damper is configured to damp pivoting movement of the trailing edge part relative to the leading edge part.

13. The wing according to claim 1, wherein the connection assembly is a first connection assembly,
wherein the trailing edge high lift assembly comprises a second connection assembly movably mounting the flap to the main wing together with the first connection assembly,
wherein the trailing edge part of the flap comprises a first part portion and a second part portion arranged next to each other in a span direction,
wherein the second linkage of the first connection assembly is coupled to the first part portion and the second linkage of the second connection assembly is coupled to the second part portion of the trailing edge part of the flap.

14. A trailing edge high lift assembly for the wing according claim 1, comprising:
a flap, and a connection assembly for movably mounting the flap to the main wing, such that the flap is movable between a retracted position and at least one extended position, wherein the connection assembly comprises an actuator unit for moving the flap between the retracted position and the at least one extended position, wherein the flap comprises a leading edge part and a trailing edge part mounted to the leading edge part in a manner pivotable about a pivot axis, wherein the actuator unit is coupled to the leading edge part via a first linkage and is coupled to the trailing edge part via a separate second linkage, the actuator unit is configured to move both the leading edge part via the first linkage and the trailing edge part via the separate second linkage.

15. An aircraft comprising the wing according to claim 1.

16. An aircraft comprising the trailing edge high lift assembly according to claim 14.

* * * * *